(12) United States Patent
Reichardt et al.

(10) Patent No.: US 12,005,775 B2
(45) Date of Patent: Jun. 11, 2024

(54) VALVE ASSEMBLY FOR A FUEL TANK

(71) Applicant: Alfmeier Präzision SE, Treuchtlingen (DE)

(72) Inventors: Christoph Reichardt, Buchdorf (DE); Werner Ruppert, Langenaltheim (DE); Markus Stephan, Gnotzheim (DE)

(73) Assignee: Alfmeier Präzision SE, Treuchtlingen (DE)

( * ) Notice: Subject to any disclaimer, the term of this patent is extended or adjusted under 35 U.S.C. 154(b) by 22 days.

(21) Appl. No.: 18/075,715

(22) Filed: Dec. 6, 2022

(65) Prior Publication Data

US 2023/0173912 A1 Jun. 8, 2023

(30) Foreign Application Priority Data

Dec. 7, 2021 (DE) ...................... 20 2021 106 663.6

(51) Int. Cl.
| | |
|---|---|
| *B60K 15/035* | (2006.01) |
| *F16K 1/36* | (2006.01) |
| *F16K 1/42* | (2006.01) |
| *F16K 24/04* | (2006.01) |
| *F16K 27/02* | (2006.01) |
| *F16K 31/56* | (2006.01) |

(52) U.S. Cl.
CPC ......... *B60K 15/03519* (2013.01); *F16K 1/36* (2013.01); *F16K 1/42* (2013.01); *F16K 24/04* (2013.01); *F16K 27/02* (2013.01); *F16K 31/566* (2013.01); *F16K 2200/302* (2021.08); *F16K 2200/3053* (2021.08); *Y10T 137/86324* (2015.04)

(58) Field of Classification Search
CPC .... B60K 15/03519; B60K 2015/03026; B60K 2015/03552; Y10T 137/86324; Y10T 137/86332; F16K 24/04
USPC .......................................................... 141/59
See application file for complete search history.

(56) References Cited

U.S. PATENT DOCUMENTS

| | | | | |
|---|---|---|---|---|
| 6,105,612 A | * | 8/2000 | Schaar | B60K 15/03519 141/59 |
| 10,059,197 B2 | * | 8/2018 | Ecim | B60K 15/04 |

* cited by examiner

*Primary Examiner* — Robert K Arundale
(74) *Attorney, Agent, or Firm* — JK Intellectual Property Law, PA

(57) ABSTRACT

A valve device for a fuel tank of a motor vehicle includes, for example, a housing having a tank connection for connecting the valve device to a vent line going to or coming from the fuel tank, and a filter connection for connecting the valve device to a vent line going to or coming from an activated charcoal filter. The tank connection and the filter connection are fluidically connected to one another inside the housing through a vent duct. A valve is arranged inside the housing for opening and at least partially closing the vent duct, wherein the valve has a valve element that is movably mounted between an opening position and a closed position inside the housing along a longitudinal axis of the housing. An actuating element is accessible from outside the valve device, which is movably mounted along the longitudinal axis inside the housing and motion-coupled in such a way with the valve element that a movement of the actuating element in a closing direction moves the valve element in closing direction. A valve element return element is configured to move the valve element in an opening direction, and arranged outside the vent duct, between the valve element and the housing.

18 Claims, 4 Drawing Sheets

VALVE ASSEMBLY FOR A FUEL TANK

CROSS-REFERENCE TO RELATED APPLICATIONS

The present application claims the benefit of German Patent Application No. DE 20 2021 106 663.6, filed Dec. 7, 2021, and incorporated by reference herein.

TECHNICAL FIELD

The disclosure relates to a valve device for a fuel tank of a motor vehicle. In particular, the disclosure relates to a valve device for a ventilation system for a fuel tank of a motor vehicle, thus a valve device to remove or supply a fluid, preferably gas or air, or air with fuel vapors containing hydrocarbons or enriched or saturated with hydrocarbons, from or in a fuel tank. In other words: The valve device can be used in connection with the ventilation of the fuel tank. The following use of the term vent should in each case also include the possibility of ventilating, i.e. a vent duct can also be used as ventilation duct, a vent line can also be used as a ventilation line, and a vent valve can also be used as a ventilation valve.

BACKGROUND

Current motor vehicle tank systems encompass numerous individual valves that perform various tasks in each case. An essential task consists of preventing fuel vapors from being emitted to the environment. Commercial gasoline fuels have the property of emitting volatile gaseous components, more specifically hydrocarbons. These hydrocarbon emissions, however, should not reach the atmosphere and are therefore guided to pass through an activated charcoal container or activated charcoal filter (hereinafter also known as "ACF"), where they are retained or adsorbed. So the ACF can be cleaned again, fresh air is suctioned from the environment by the ACF ("regeneration"). The hydrocarbons stored in the ACF are released to the passing air and supplied to the engine, where they undergo combustion during the operation of the motor vehicle.

When the tank is refilled with fuel, the air enriched with hydrocarbons must be displaced from the tank without directly reaching the atmosphere. In the conventional tank systems in Europe, hydrocarbon emissions during refueling are exclusively returned through a line connecting the tank with the filler neck and sucked off by the nozzle.

This is where the so-called switching valves are used, which close a vent duct leading from the fuel tank to the ACF during refueling. In this case, the switching valve is either directly activated by the nozzle introduced in the filling tube of the fuel tank or indirectly by means of a flap activated by the nozzle, the so-called lead-free flap, and moved to a closed position. Thus, during refueling of the vehicle, the ACF is not—or at least not significantly—loaded with hydrocarbons. So the switching valve can be opened or kept open during the operation of the vehicle, this valve has a return spring that moves and holds the valve element of the switching valve in opening position when the nozzle is not introduced. In this way, gas or air or air with fuel vapors containing hydrocarbons or air enriched or saturated with hydrocarbons can flow from the fuel tank to the ACF when the vehicle is being operated.

A valve device encompassing a tank valve that fulfills the preceding function is known, for example, from EP 3 216 640 A1. The tank valve includes a valve tappet activated by the nozzle or a pivoted flap, and a tank valve body movable to a closed position during refueling by the valve tappet to close the tank valve and hence a vent duct that leads from the tank to the ACF. Here, the return spring that reopens the tank valve is arranged between the tank valve body and the valve device housing inside the vent duct. This has the disadvantage that the return spring therefore lies in the flow area of the vent duct and when the tank valve opens during the normal operation of the vehicle, this leads to a high flow resistance.

SUMMARY

The purpose of the disclosure is therefore to suggest a valve device for a fuel tank with reduced flow resistance compared to the known valve devices.

The task of the disclosure is solved by the valve device according to disclosure. Advantageous embodiments and further developments result in each case from the disclosure as well.

The valve device according to the disclosure for a motor vehicle fuel tank, especially for a ventilation system of a motor vehicle fuel tank, encompasses a housing with a tank connection for connecting the valve device to a vent duct that leads to or from the fuel tank and a filter connection for connecting the valve device to a vent duct leading to or from an active charcoal filter. Inside the housing, the tank connection and the filter connection are fluidically connected to one another through a vent duct to guide fluids, preferably gas or air, or fuel vapors containing hydrocarbons or air enriched or saturated with hydrocarbons, from the fuel tank to the active charcoal filter. Inside the housing, a valve, a so-called switching valve, is arranged to open and at least partially close the vent duct, wherein the valve has one valve element movably mounted inside the housing along a longitudinal axis of the housing between an opening position and a closed position. In other words: The valve element is axially movable inside the housing in an opening direction and in a closing direction along the longitudinal axis of the housing. Moreover, the valve device encompasses an actuating element accessible from outside the valve device that especially projects into the filling pipe of the fuel tank and is movably mounted inside the housing along the longitudinal axis and motion-coupled with the valve element in such a way that a movement of the actuating element in closing direction moves the valve element in closing direction. In other words: A movement of the actuating element in closing direction—caused by the activation of the actuating element, or the effect of force on it, from outside the valve device, especially directly by means of a nozzle introduced in the filling pipe or indirectly by means of flap movable by the nozzle during refueling that pushes or presses the actuating element in closing direction—is transferred to the valve element, so that the latter is likewise moved or pushed in closing direction. The valve device additionally encompasses a valve element return element configured to move the valve element in an opening direction as soon as the actuating element is no longer activated, so no force has an effect on it any longer. In other words: The valve return element is a valve element return element that takes effect in opening direction. According to the disclosure, the valve element return element is arranged outside the vent duct, between the valve element and the housing.

The disclosure thus offers the advantage that the valve element return element, which ensures an opening of the valve during the normal operation of the motor vehicle by moving the valve element in the opening position or keeping it in opening position, is arranged outside the flow area of the vent duct. As a result of this, the flow resistance inside the vent duct of the valve device can be greatly reduced without having to enlarge its dimensions, something always desirable in the automotive sector due to the small space requirement.

Advantageously, the valve element return element rests on the housing with a first end facing the valve or a valve opening of the valve, and on the valve element with a second end facing away from the valve or valve opening.

Moreover, to achieve a support and guidance of the valve element return element, the housing preferably forms a first seat (or: first insertion section) for a first end section of the valve element return element forming the first end and/or the valve element a second seat (or: second insertion section) for a second end section of the valve element return element forming the second end. The first seat is especially formed by wall sections extending perpendicularly inwards in opening direction from a front-side wall section of the housing. The second seat is especially formed by an L-shaped wall section in cross section extending away from an outer side of the valve element.

According to an advantageous embodiment, the valve element is at least partially arranged and inserted inside the housing and/or the actuating element is at least partially arranged and inserted inside the valve element. The insertion of the valve element inside the housing takes place especially by wall sections extending perpendicularly towards the interior in opening direction from a front-side wall section of the housing. To insert the actuating element, the valve element is preferably shaped essentially as a hollow cylinder.

The valve element is moved by a direct or indirect movement of the actuating element. An advantageous further development provides that an elastic element, arranged between the valve element and the actuating element, is configured to transfer a movement of the actuating element in closing direction to the valve element. Thus, the movement coupling takes place indirectly through the elastic element by compressing it to a lesser degree than the valve element return element when the valve is being closed.

In addition, the elastic element is especially configured for absorbing a force acting on the actuating element in the closed position of the valve element. This prevents a transfer of the force exerted by the nozzle on the actuating element to the valve. Hence, this always ensures the closing effect of the valve and reliably prevents valve damage.

This can be achieved in a constructively advantageous way by making the elastic element stiffer than the valve element return element.

According to an advantageous further development, the elastic element rests on the valve element with a first end facing the valve or vent duct, and on the actuating element with a second end facing away from the valve or valve opening.

Furthermore, to achieve a support and insertion of the elastic element, the valve element has a first seat (or: first insertion section) for a first end section of the elastic element forming the first end and/or the actuating element a second seat (or: second insertion section) for a second end section of the elastic element forming the second end.

The first seat is formed especially by a front-end section of the valve element facing the vent duct and a wall section extending in opening direction from the front-end section. The second seat is formed especially by a recess extending into the actuating element along the longitudinal axis, for example by a drilled hole introduced into the actuating element.

For practical purposes, the valve return element and/or the elastic element is/are formed as spring, wherein a spring constant of the elastic element is larger than a spring constant of the valve return element.

Moreover, to close the valve on the front-end section of the valve element facing the vent duct, a sealing element has been preferably arranged on the upper side, attached to the valve element and/or the housing and acting together with a valve seat of the valve to close the valve.

The sealing element is especially configured as a flexible membrane. The membrane can be attached to the housing in an outer peripheral area or be clamped therein. In a central section, the membrane can be additionally attached to the valve element and/or be secured against torsion. Furthermore, the membrane can have a circumferential circular flexible annular ring that functions as a kind of hinge when the valve moves.

As described above, the main purpose of the valve is to close the vent duct from the fuel tank to the activated charcoal filter during refueling. In some cases, however, it is desirable to maintain another vent duct open in a throttled way. According to an advantageous design, the sealing element can thus have an opening with a considerably smaller opening cross section between tank connection and filter connection compared with the vent duct, and configured for creating a fluidic connection between the filter connection and the filling tube.

The aforementioned opening can have any geometry, and be configured, for example, as round drilled hole, or be oval, triangular, polygonal or slit-shaped as well. In particular, the opening is configured as a cross slot contour, wherein the opening cross section varies depending on the flow.

The housing of the valve device can be configured as one single piece. Preferably, however, the housing is configured in multiple parts and has at least one first and one second housing part that are detachably connected to one another or can be connected. This is advantageous, for example, when the valve components—especially the valve element, actuating element, valve element return element, elastic element, and sealing element—can be pre-mounted together with one of the housing parts and then the housing parts are connected to one another.

BRIEF DESCRIPTION OF THE DRAWINGS

The disclosure will now be explained in more detail with reference to the enclosed drawings, which show.

DETAILED DESCRIPTION

Figure 1:
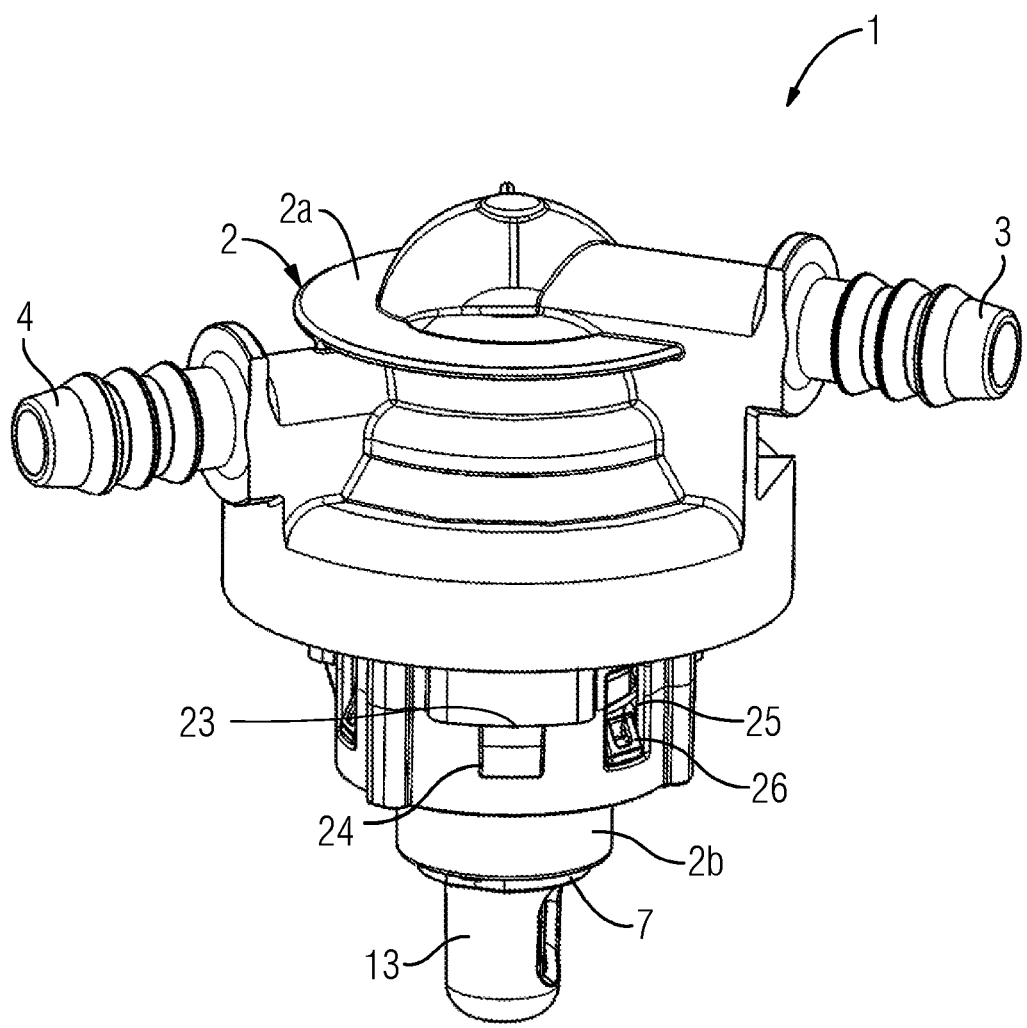
FIG. 1 is a perspective view of a valve device according to the disclosure.
Figure 2:
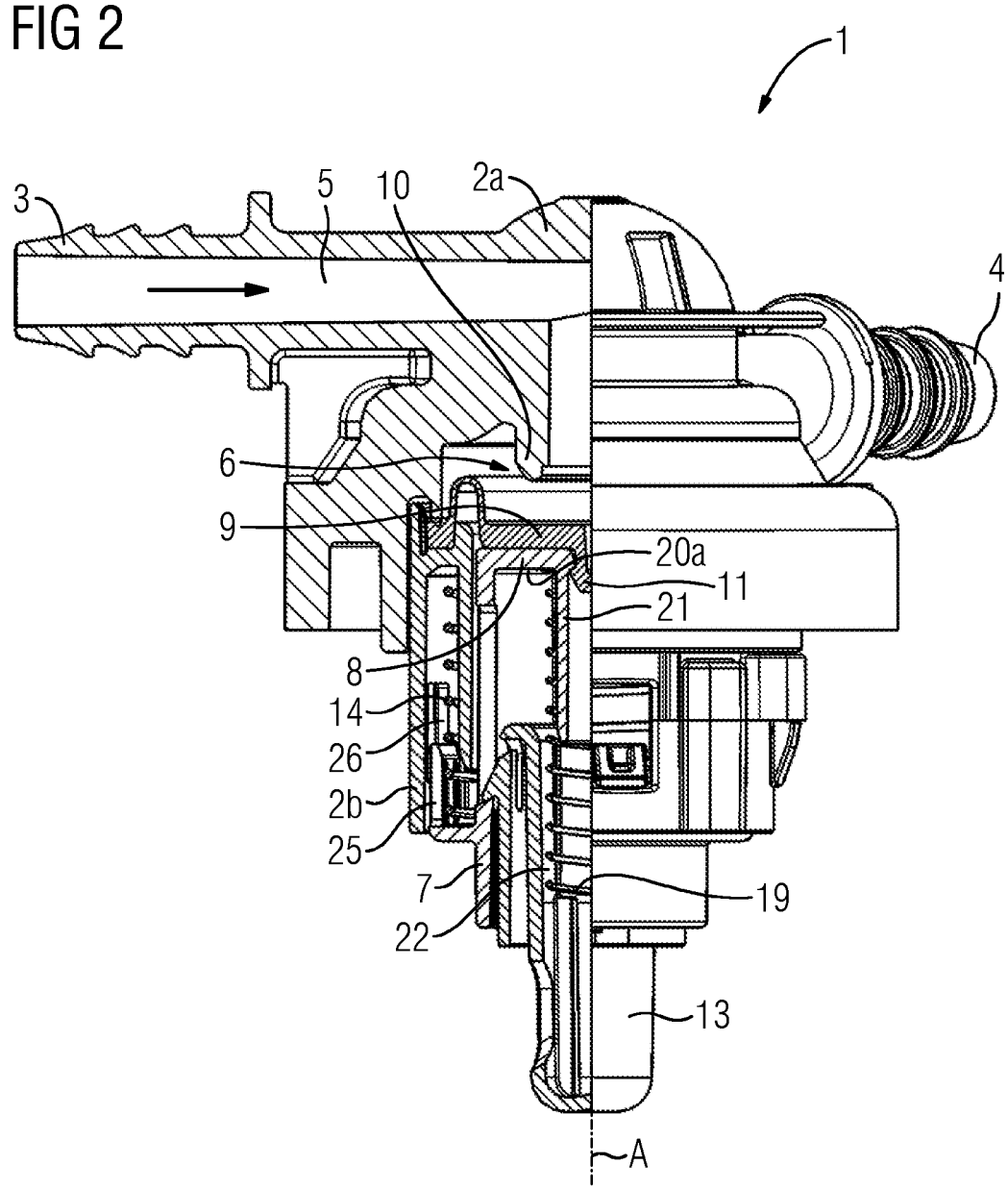
FIG. 2 is a sectional view of the valve device from FIG. 1 according to the disclosure along a sectional plane centrally cutting the tank connection according to a first embodiment.
Figure 3:
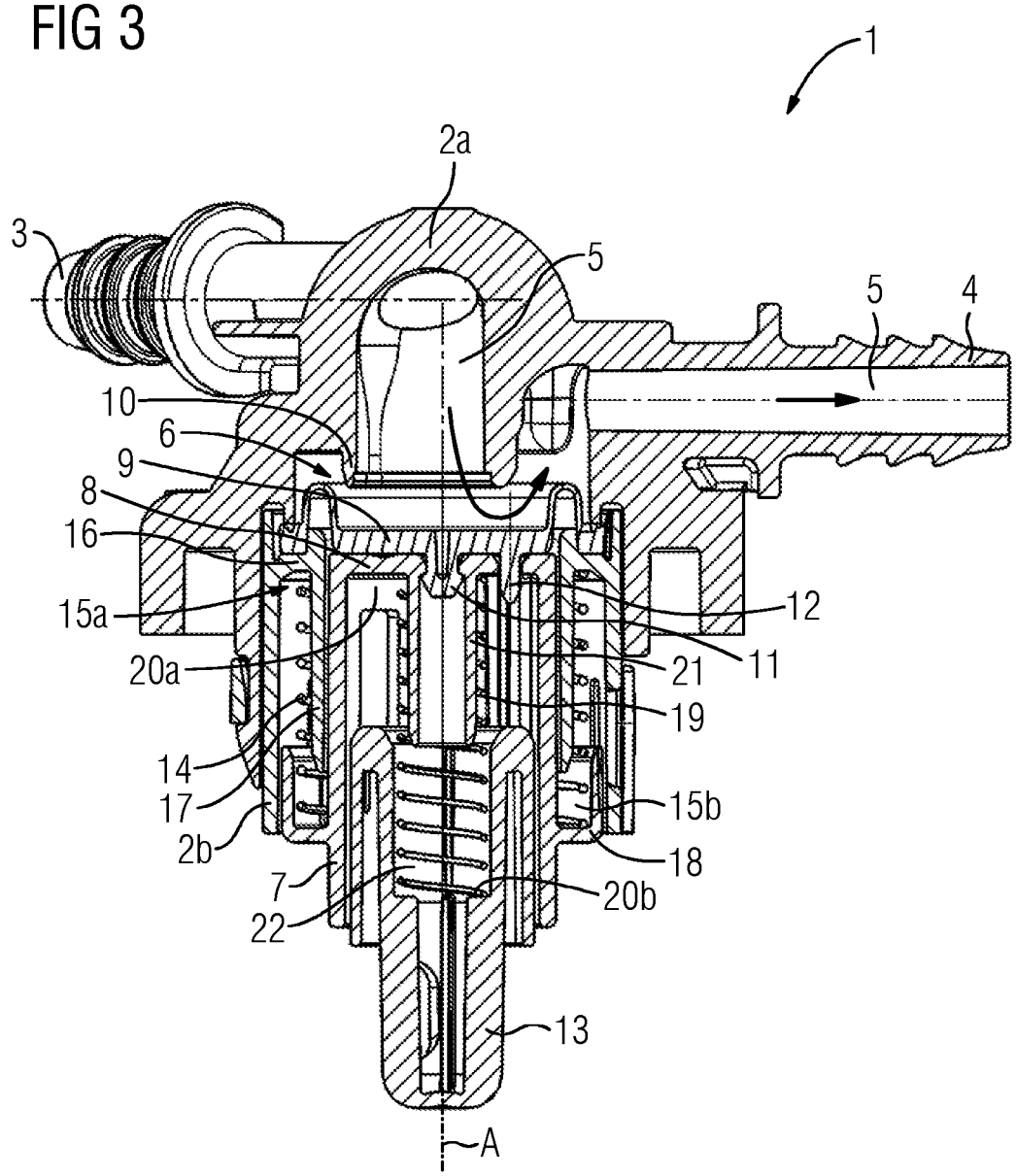
FIG. 3 is a sectional view of the valve device according to the disclosure from FIG. 1 along a sectional plane centrally cutting the filter connection according to a first embodiment.

The valve device 1 for a fuel tank of a motor vehicle has a housing 2 that encompasses here a first housing part 2a and a second housing part 2b. Here, the first housing part 2a and the second housing part 2b are connected together or inserted into one another by means of the latching hook 24 present in the first housing part 2a and the latching bows 23 configured in the second housing part 2b. The housing 2, here the first housing part 2a, has a tank connection for connecting the valve device 1 with a vent duct going to or coming from the fuel tank (not shown) and a filter connection 4 for connecting the valve device 1 with one vent line going to or coming from the activated charcoal filter (not shown). Inside the housing 2, the tank connection 3 and the filter connection 4 are fluidically connected to each other through a vent duct 5. During the normal operation of the motor vehicle, a fluid—preferably gas or air or air with fuel vapors containing hydrocarbons or air enriched or saturated with hydrocarbons—can flow from the fuel tank through the vent duct 5 to the activated charcoal filter, as indicated by arrows in FIGS. 2 and 3.

Inside the housing 2, a valve 6 for opening and at least partially closing the vent duct 5 is arranged. The valve has a valve element 7, which is movably mounted between an opening position and a closed position inside the housing 2 along a longitudinal axis A of the housing 2. The valve element 7 is connected to the housing part 2b by means of locking latches 26 that engage in recesses 25 of the second housing part 2b. The valve element 7 is shaped essentially as a hollow cylinder and supports in one front-end section 8 facing the vent duct, on the upper side, i.e., the side facing the vent duct, a sealing element 9, here a flexible membrane, for closing the valve 6, which is clamped in an outer peripheral area between the first housing part 2a and the second housing part 2b. In the figures, the valve 6 is shown in its opening position, so that fluid can flow through the vent duct 5. In the closed position, the valve element 7 and the sealing element 9 act together with a valve seat 10 formed in the first housing part 2a. To prevent the sealing element 9 from detaching from the valve element 7 when the valve 6 is opened, it has here a fixing projection 11 in a central section introduced in the recess 8 present in the front-end section 8 and grips it from behind. Moreover, the sealing element 8 has a pin 12 inserted into another recess of the front-end section 8 of the valve element 7 to secure the sealing element 9 against a rotation.

The valve device 1 additionally encompasses an actuating element 13 accessible from outside the valve device 1 that is movably mounted along the longitudinal axis A inside the housing 2. The actuating element 13 is arranged inside the valve element 7 and movably coupled with the valve element 7 in such a way that a movement of the actuating element 13 in a closing direction moves the valve element 7 in closing direction.

Between the housing 2, in this case between the second housing part 2b and the valve element 7, a valve element return element 14, here a spring, has been arranged, configured for moving the valve element 7 in an opening direction. According to the disclosure, the valve element return element 14 is arranged outside the vent duct 5, between the valve element 7 and the housing 2, here between the second housing part 2b. The valve element return element 14 rests on the housing 2, more specifically on the second housing part 2b, with a first end facing the valve 6 or the vent duct 5, and on the valve element 7 with a second end facing away from the valve 6 or the vent duct 5. Here, for the valve element return element 14, the housing part 2b forms a first seat 15a, formed by a wall section 17 extending perpendicularly inwards in opening direction from a front-end section 16 of the housing part 2b. A second seat 15b is formed here by an L-shaped wall section 18 in cross section that extends away from an outer side of the valve element 7.

The wall section 17 of the housing part 2b additionally forms an insertion section for the valve element 7, so that the valve element 7 is inserted at least partially inside the housing 2.

The actuating element 13 is arranged and inserted at least partially inside the valve element 7.

An elastic element 19, likewise a spring, has been arranged between the valve element 7 and the actuating element 13, configured for transferring a movement of the actuating element 13 in closing direction to the valve element 7. Additionally, the elastic element 19 has been configured to absorb a force acting on the actuating element 13 in the closed position of the valve element 7, in order not to impair the closing effect of the valve 6 and prevent damages to the valve 6 by uncoupling a possible force of the nozzle on the actuating element 13 from the valve element 7 and thus from the valve 6. To achieve this, the elastic element 19 is stiffer and in this case has a larger spring constant than the valve element return element 14.

The elastic element 19 rests on the valve element 7 with a first end facing the valve 6 or the vent duct 5 and on the actuating element 13 with a second end facing away from the valve 6 or the valve opening. In this case, the valve element 7 forms a first seat 20a for a first end section of the elastic element 19 forming the first end, formed by the front-end section 8 of the valve element 7 and a wall section 21 extending from it in opening direction. Here, the actuating element 13 forms a second seat 20b for a second end section of the elastic element 19 forming the second end, formed by a recess 22 extending into the actuating element 13 along the longitudinal axis A.

During refueling, the vent duct 5 is at least partially closed with the valve 6 in that the nozzle presses the actuating element in closing direction, thus moving the valve element 7 with it in closed position. In the embodiment shown in FIGS. 2 and 3, the vent duct 5 is completely closed.

Figure 4:
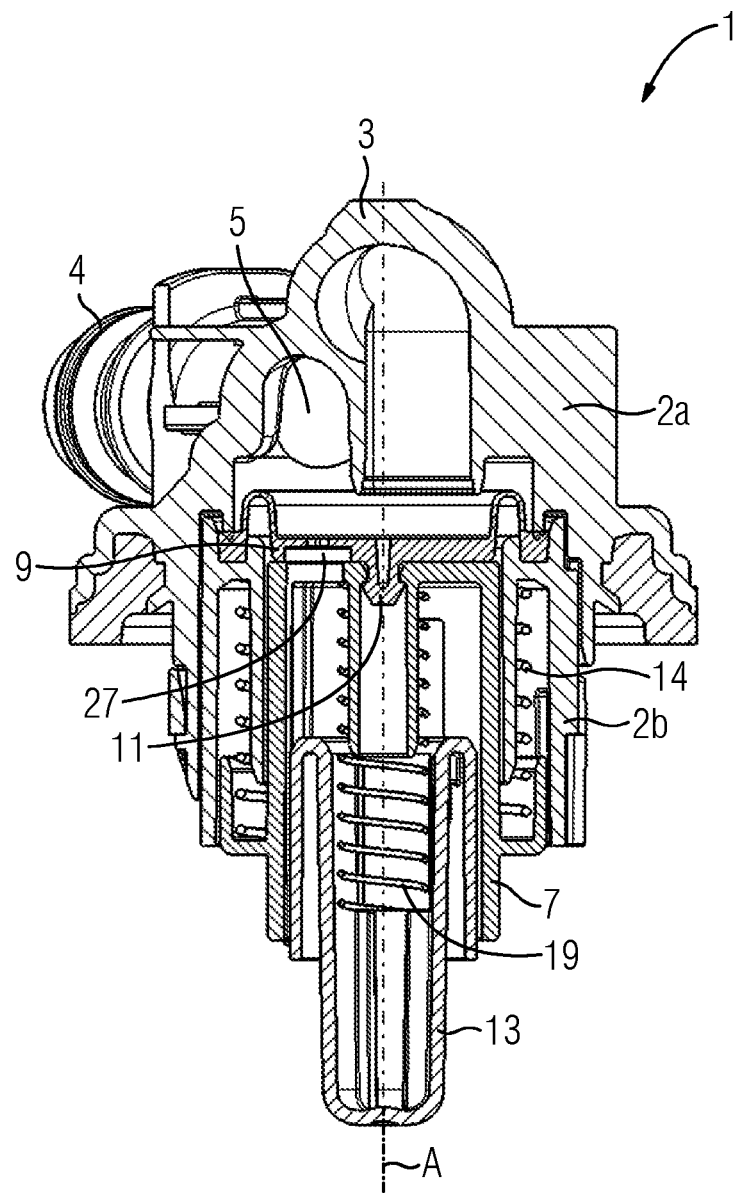
FIG. 4 is a sectional view corresponding to FIG. 3 of a valve device according to the disclosure in accordance with a second embodiment.

FIG. 4 shows a valve device 1 according to a second embodiment in which—in contrast to the valve device 1 according to the first embodiment—a partial flow through the vent duct 5 is also possible in the closed position. To achieve this, the sealing element 9 has an opening 27 whose opening cross section is considerably smaller compared with the vent duct 5. Consequently, a fluidic connection is possible in closed position between the filter connection 4 and a filling pipe. The opening 27 is preferably configured in form of a cross slot, so that the opening cross section varies depending on the flow rate. Apart from that, the valve device 1 shown in FIG. 4 corresponds to the one in FIGS. 2 and 3, so that with regard to additional features, reference is exclusively made to the above description.

LIST OF REFERENCE CHARACTERS

1 Valve device
2 Housing
2a First housing part
2b Second housing part
3 Tank connection
4 Filter connection
5 Vent duct
6 Valve
7 Valve element
8 Front end
9 Sealing element 10 Valve seat
11 Fixing projection
12 Nozzle
13 Actuating element
14 Valve element return element
15a First seat
15b Second seat
16 Front end of the second housing part 2b
17 Wall section
18 Wall section
19 Elastic element
20a First seat
20b Second seat
21 Wall section
22 Recess
23 Latching bows
24 Latching hook
25 Recess
26 Locking latch
27 Opening
A Longitudinal axis

The invention claimed is:

1. A valve device for a fuel tank of a motor vehicle, comprising: a housing having a tank connection for connecting the valve device to a vent line going to or coming from the fuel tank and a filter connection for connecting the valve device to a vent line going to or coming from an activated charcoal filter, wherein the tank connection and the filter connection are fluidically connected to one another inside the housing through a vent duct; a valve arranged inside the housing for opening and at least partially closing the vent duct, wherein the valve has a valve element movably mounted inside the housing, along a longitudinal axis of the housing, between an opening position and a closed position; an actuating element accessible from outside the valve housing, movably mounted inside the housing along the longitudinal axis and motion-coupled with the valve element in such a way that a movement of the actuating element in a closing direction moves the valve element in closing direction; and a valve element return element, configured to move the valve element in an opening direction; wherein the valve element return element is arranged outside the vent duct between the valve element and the housing.

2. The valve device according to claim 1, wherein the valve element return element rests on the housing with a first end facing the valve and on the valve element with a second end facing away from the valve.

3. The valve device according to claim 2, wherein the housing has a first seat for a first end section of the valve element return element forming the first end and/or a second seat for a second end section of the valve element return element forming the second end.

4. The valve device according to claim 3, wherein the first seat is formed by a front-end wall section of the housing extending perpendicularly inward in the opening direction and/or the second seat by an L-shaped wall section in cross section extending away from an external side of the valve element.

5. The valve device according to claim 1, wherein the valve element is inserted at least partially inside the housing, wherein the housing forms an insertion section for the valve element that is formed by a wall section-extending perpendicularly inwards from the front-end wall section of the housing.

6. The valve device according to claim 1, wherein the actuating element is arranged and inserted at least partially inside the valve element.

7. The valve device according to claim 1, wherein an elastic element is arranged between the valve element and the actuating element, configured to transfer a movement of the actuating element in the closing direction to the valve element.

8. The valve device according to claim 7, wherein the elastic element is additionally configured to absorb a force acting on the actuating element in the closed position of the valve element.

9. The valve device according to claim 7, wherein a stiffness of the elastic element is larger than a stiffness of the valve element return element.

10. The valve device according to claim 7, wherein the elastic element rests on the valve element with a first end facing the valve, and on the actuating element with a second end facing away from the valve.

11. The valve device according to claim 7, wherein the valve element has a first seat for a first end section of the elastic element forming the first end and/or the actuating element a second seat for a second end section of the elastic element forming the second end.

12. The valve device according to claim 11, wherein the first seat is formed by a front-end section of the valve element and a wall section extending from the front-end section in opening direction, and/or the second seat by a recess along the longitudinal axis extending into the actuating element.

13. The valve device according to claim 1, wherein the valve element return element and/or the elastic element is/are a spring, wherein a spring constant of the elastic element is larger than a spring constant of the valve return element.

14. The valve device according to claim 1, wherein to close the valve, a sealing element is arranged on an upper side of the front-end section of the valve element and attached to the valve element and/or to the housing.

15. The valve device according to claim 14, wherein the sealing element is configured as a flexible membrane.

16. The valve device according to claim 14, wherein the sealing element has an opening with a smaller opening cross section compared to the vent duct and is configured to make a fluidic connection in closed position between the filter connection and a filling pipe.

17. The valve device according to claim 16, wherein the opening is configured as a cross slot contour.

18. The valve device according to claim 1, wherein the housing has a first and second housing part that are detachably connected to one another or can be connected.

* * * * *